UNITED STATES PATENT OFFICE.

JEROME M. BARBER AND ALBERT W. LICKLY, OF WRIGHT, MICHIGAN.

ROOFING-PAINT.

SPECIFICATION forming part of Letters Patent No. 364,887, dated June 14, 1887.

Application filed February 16, 1887. Serial No. 227,832. (No specimens.)

*To all whom it may concern:*

Be it known that we, JEROME M. BARBER and ALBERT W. LICKLY, both residents of Wright, in the county of Ottawa and State of Michigan, have invented certain new and useful Improvements in Fire and Water Proof Paint; and we do hereby declare that the following is a full, clear, and exact description of the invention, which will enable others skilled in the art to which it appertains to make and use the same.

Our composition consists of the following ingredients combined in the proportions stated, viz: coal or gas tar, thirty-one and one-half gallons; rosin, forty pounds; tallow, twenty-five pounds; sulphur, ten pounds; borax, ten pounds; ground iron ore, twenty pounds; yellow ocher, twenty pounds; water-lime, twenty pounds; plaster-of-paris, ten pounds; asbestus, ten pounds.

*Directions for preparing our paint.*

First. Take the full amount of rosin, (forty pounds,) tallow, (twenty-five pounds,) sulphur, (ten pounds,) and borax, (ten pounds,) together with five gallons of tar, and heat them until they become thoroughly mingled. Then add the remainder of the tar (twenty-five and one-half gallons) and heat until they arrive at a boiling state.

Second. Take the full amount of each of the following ingredients and mix them together in their dry state: yellow ocher, twenty pounds; water-lime, twenty pounds; plaster-of-paris, ten pounds; asbestus, ten pounds; ground iron ore, twenty pounds.

Third. Now take the tar, rosin, sulphur, borax, and tallow, after they have become thoroughly mingled, and mix them in proportional quantities—that is, to one-fourth of the liquid ingredients mix the same amount of dry ingredients (viz., ground iron ore, yellow ocher, water-lime, plaster-of-paris, and asbestus) thoroughly together—and apply it to the object to be painted in a heated state.

What we claim, and desire to secure by Letters Patent of the United States, is—

The herein-described composition of matter used for painting, consisting of coal or gas tar, rosin, tallow, sulphur, borax, ground iron ore, yellow ocher, water-lime, plaster-of-paris, and asbestus, in proportions specified.

In testimony that we claim the foregoing as our own we have hereunto affixed our signatures in presence of two witnesses.

JEROME M. BARBER.
ALBERT W. LICKLY.

Witnesses:
JOSEPH VOORHEES,
LOTTIE A. EMERICK.